April 8, 1958 — R. R. MUSSER — 2,829,882
AUXILIARY SPRING FOR VEHICLES
Filed May 29, 1956
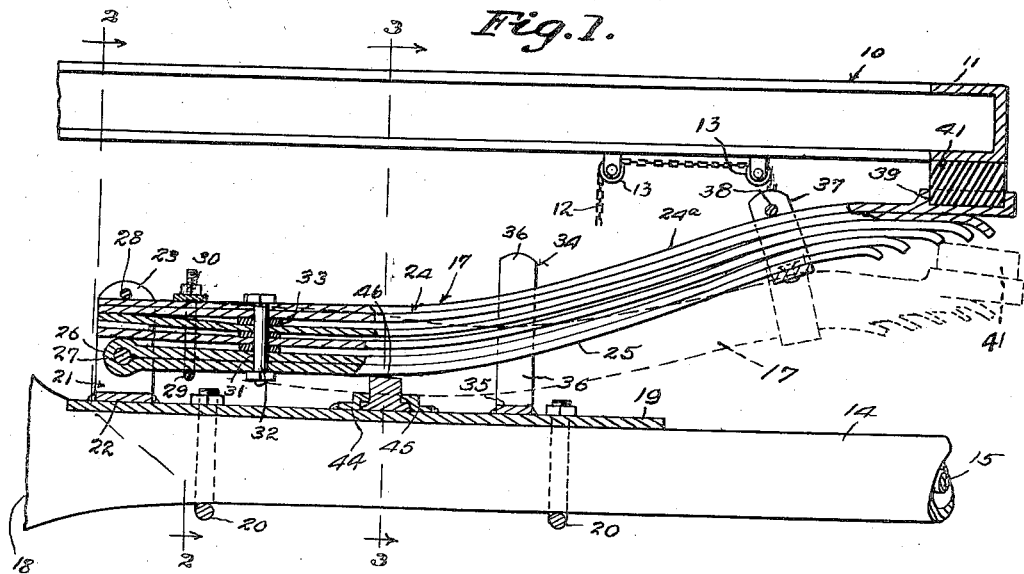
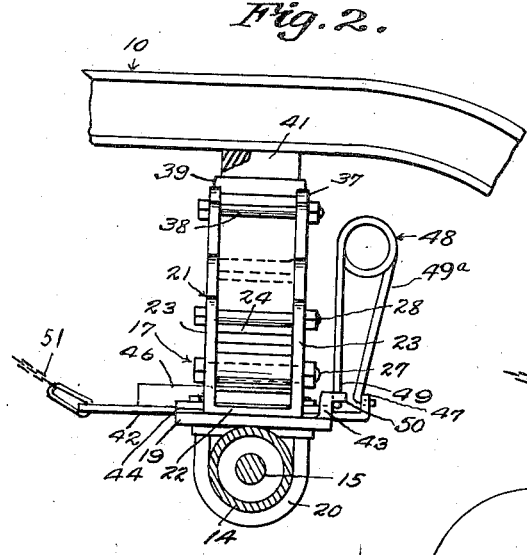
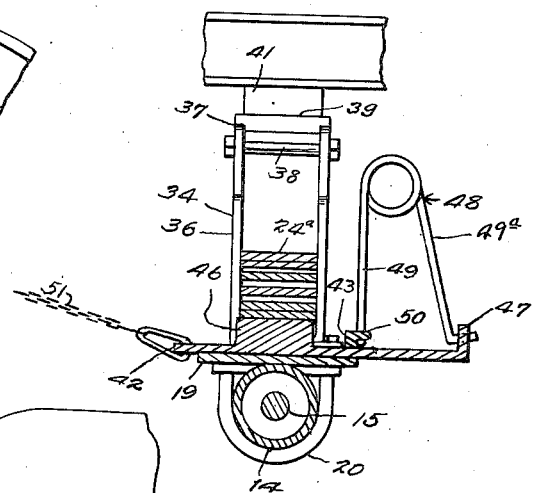
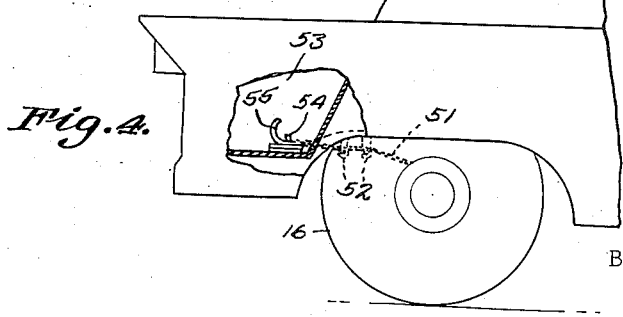
Robert R. Musser
INVENTOR
BY C. A. Snow & Co.
ATTORNEYS.

United States Patent Office 2,829,882
Patented Apr. 8, 1958

2,829,882

AUXILIARY SPRING FOR VEHICLES

Robert R. Musser, San Bernardino, Calif.

Application May 29, 1956, Serial No. 588,101

4 Claims. (Cl. 267—41)

This invention relates to an auxiliary spring for vehicles.

An object of this invention is to provide an auxiliary spring adapted to take up any overload on the vehicle so as to cushion the movement of the vehicle body.

Another object of this invention is to provide an overload or auxiliary spring which can be readily mounted on the rear axle housing of a vehicle for engagement with the frame when the vehicle is overloaded.

A further object of this invention is to provide an overload or auxiliary spring the tension of which can be adjusted in order to provide for proper operation of the spring under varying loads.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a rear elevational view partly in section showing an overload spring constructed according to an embodiment of this invention disposed in operative position.

Fig. 2 is a sectional view taken on the line 2—2 of Fig. 1.

Fig. 3 is a sectional view taken on line 3—3 of Fig. 1.

Fig. 4 is a fragmentary side elevation partly broken away and in section showing the rear portion of a vehicle with the overload tension adjusting means extended to the rear compartment of the vehicle.

Referring to the drawings, the numeral 10 designates generally the frame or chassis of a vehicle having longitudinal side frame members 11. The vehicle also includes a rear axle housing 14 with an axle 15 rotatable therein and rear wheels 16 are secured on the outer ends of the axle 15.

In order to provide a means whereby an auxiliary or overload spring construction may be interposed between the axle housing 14 and the frame or chassis 10, I have provided a spring assembly generally indicated at 17. There is a spring assembly disposed on each side of the differential 18. Each spring assembly 17 includes a base plate 19 which is secured by means of U-bolts 20 to the axle housing 14. The base plate 19 is disposed on the upper side of the housing 14 and the inner end of the plate 19 has secured thereto a U-shaped member 21. The U-shaped member 21 includes a lower bight member 22 which is fixed as by welding or the like to the upper side of the plate 19 and a pair of upstanding ears 23 rise from the bight 22.

A plurality of superposed longitudinally bowed intermediate spring elements 24 are disposed at their inner ends between the ears 23 and the lowermost one 25 of the spring elements 24 is formed with an eye 26 at the inner end thereof. A bolt 27 extends through the eye 26 and through the ears 23. An upper clamping bolt 28 also extends through the ears 23 adjacent the upper ends thereof and on the upper side of the upper one 24ª of the spring leaf members 24. A U-bolt 29 engages about the spring leaf members 24 and 25, with a bar 30 extending between the ends thereof and bolt 29 permits the addition or removal of spring leaf members 24 from the assembly. Each leaf member 24, 24ª, and 25 is formed with an opening 31 outwardly from the inner end thereof and a bolt 32 extends downwardly through the aligned openings 31. Preferably non-corrosive washers 33 are interposed between the confronting faces of the leaf members 24 and 25. These washers 33 provide a means to vary the tension of spring 17.

A guide member 34 of U-shaped configuration has the bight 35 thereof fixed to the upper side of plate 19 outwardly from the inner end of the latter, and the guide member 34 includes a pair of parallel upstanding arms 36 engaging loosely on the opposite edges of the leaf members 24, 24ª and 25. An outer U-shaped clamp 37 engages about the outer portions of the leaf members 24, 24ª and 25, being secured about the leaf members by means of a clamping bolt 38. The upper leaf 24ª of the leaf members 24 at the outer end thereof has an upwardly opening socket 39 within which a rubber block or cushion member 41 is adapted to be secured. When the spring assembly 17 is in inoperative position the assembly will be disposed in the dotted line position shown in Fig. 1.

The spring assembly 17 may be raised to an operative position and secured in such operative position as will be hereinafter set forth. A chain or flexible member 12 is connected at one end to bolt 38 and is extended over pulleys or rollers 13 to a remote point, as for example in the trunk or rear compartment of the vehicle. A pull on chain 12 will raise the outer end of assembly 17 to dispose block 41 in contact with the lower side of frame members 11.

The assembly 17 is locked in its operative position by means of a block or wedge 46 which is carried by a slide plate 42. Plate 42 is slidable in guides 44 and 45 fixed to the upper side of plate 19. The guides 44 and 45 have an upstanding flange 43 at one end in which one end 50 of a spring arm 49 engages. A second spring arm 49ª engages in an upstanding lug 47 carried by one end of slide plate 42. The spring 48 constantly urges slide 42 to the right as viewed in Fig. 3 so as to dispose block 46 beneath the spring assembly. When the spring assembly 17 is in the dotted line inoperative position shown in Fig. 1, block 46 will bear at its inner end against the adjacent side of the assembly and will remain in this inoperative position until assembly 17 is raised by a pull on chain 12.

Slide plate 42 is moved to the left as viewed in Fig. 3, by means of a chain 51 so that the assembly 17 may gravitatingly drop to an inoperative position. Chain 51 engages over guide rollers 52 carried by the vehicle frame 10 and extends into the rear compartment 53. A hook 55 on the rear end of chain 51 engages a locking pin 54 so that chain 51 can be adjusted to proper length. Under normal conditions spring assembly 17 will be in a lower inoperative position with block 46 pressed against the side of the assembly by spring 48. The assembly 17 may be raised at its outer end to operative position by a pull on chain 12. When block 41 is in contact with frame member 11 the lower side of spring assembly 17 will be above or substantially flush with the upper side of block 46, so that spring 48 may move slide 42 to the right with block 46 beneath the assembly 17. When block 46 is beneath the assembly 17 chain 12 is released so that the assembly can readily move up and down under the weight of the load on the outer end thereof.

What is claimed is:

1. An auxiliary spring assembly for vehicles for interposing between the rear axle and the body of the vehicle, said assembly comprising a base plate, means securing said plate to the upper side of the rear axle housing, a spring formed of a plurality of superposed spring leaves, means pivotally securing the inner ends of said leaves relative to said plate, the outer end of said spring gravitatingly swinging downwardly to an inoperative position, a resilient cushion block carried by the outer end of the upper leaf of said spring for engagement with the lower side of the vehicle body, and spring pressed means locking said spring with said block in an upper operative position.

2. An auxiliary spring assembly for vehicles for interposing between the rear axle and the body of the vehicle, said assembly comprising a base plate, means securing said plate to the upper side of the rear axle housing, a spring formed of a plurality of superposed spring leaves, means pivotally securing the inner ends of said leaves to said plate, the outer end of said spring gravitating downwardly, a resilient cushion block carried by the outer end of the upper leaf of said spring for engagement with the lower side of the vehicle body, chain means for raising the outer end of said spring to an upper operative position, and spring pressed means for locking said spring in operative position.

3. An auxiliary spring assembly for vehicles for interposing between the rear axle and the body of the vehicle, said assembly comprising a base plate, means securing said plate to the upper side of the rear axle housing, a spring formed of a plurality of superposed spring leaves, means pivotally securing the inner ends of said leaves to said plate, the outer end of said spring gravitatingly swinging downwardly to an inoperative position, a resilient cushion block carried by the outer end of the upper leaf of said spring for engagement with the lower side of the vehicle body, a spring tensioning member slidably carried by said base plate, and means adjusting said member relative to said spring.

4. An auxiliary spring assembly for vehicles for interposing between the rear axle and the body of the vehicle, said assembly comprising a base plate, means securing said plate to the upper side of the rear axle housing, a spring formed of a plurality of superposed spring leaves, means pivotally securing the inner ends of said leaves relative to said plate, the outer end of said spring gravitatingly swinging downwardly to an inoperative position, a resilient cushion block carried by the outer end of the upper leaf of said spring for engagement with the lower side of the vehicle body, a spring tensioning member slidably carried by said base plate and movable transversely of the spring, a spring connected between said base plate and said member constantly urging said member to spring tensioning position, and flexible means for moving said member to spring disengaging position.

References Cited in the file of this patent

UNITED STATES PATENTS

| | | |
|---|---|---|
| 1,824,295 | Pohl et al. | Sept. 22, 1931 |
| 2,188,689 | Marco | Jan. 30, 1940 |
| 2,224,717 | Austin | Dec. 10, 1940 |